United States Patent
Mueller et al.

(10) Patent No.: US 8,639,601 B2
(45) Date of Patent: Jan. 28, 2014

(54) CALENDAR SPREAD FUTURES

(75) Inventors: Eugene Mueller, Libertyville, IL (US); Daniel Grombacher, Northbrook, IL (US); Frederick Sturm, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 373 days.

(21) Appl. No.: 12/791,513

(22) Filed: Jun. 1, 2010

(65) Prior Publication Data

US 2011/0295726 A1 Dec. 1, 2011

(51) Int. Cl.
*G06Q 40/00* (2012.01)
(52) U.S. Cl.
USPC .................................................. 705/35
(58) Field of Classification Search
USPC ............................... 705/30, 37, 36, 35
See application file for complete search history.

(56) References Cited

U.S. PATENT DOCUMENTS

| | | | |
|---|---|---|---|
| 2002/0138397 A1 | 9/2002 | Seeley et al. | |
| 2002/0138400 A1* | 9/2002 | Kitchen et al. | 705/37 |
| 2002/0194115 A1* | 12/2002 | Nordlicht et al. | 705/37 |
| 2003/0069830 A1* | 4/2003 | Morano et al. | 705/37 |
| 2003/0125982 A1 | 7/2003 | Ginsberg et al. | |
| 2005/0086152 A1* | 4/2005 | Sweeting | 705/37 |
| 2005/0137964 A1* | 6/2005 | Nordlicht et al. | 705/37 |
| 2005/0154660 A1 | 7/2005 | Sturm et al. | |
| 2006/0059064 A1* | 3/2006 | Glinberg et al. | 705/35 |
| 2006/0059065 A1* | 3/2006 | Glinberg et al. | 705/35 |
| 2006/0149660 A1* | 7/2006 | Morano et al. | 705/37 |
| 2006/0149662 A1* | 7/2006 | Nordlicht et al. | 705/37 |
| 2006/0271468 A1* | 11/2006 | Rosenthal et al. | 705/37 |
| 2007/0100732 A1* | 5/2007 | Ibbotson et al. | 705/37 |
| 2007/0136180 A1* | 6/2007 | Salomon et al. | 705/37 |
| 2008/0154764 A1* | 6/2008 | Levine et al. | 705/37 |
| 2008/0228633 A1* | 9/2008 | Kalt | 705/37 |
| 2008/0288391 A1* | 11/2008 | Downs et al. | 705/37 |
| 2008/0319920 A1* | 12/2008 | Levin et al. | 705/36 R |
| 2009/0254471 A1 | 10/2009 | Seidel et al. | |
| 2009/0271325 A1* | 10/2009 | Wilson | 705/36 R |
| 2010/0030702 A1 | 2/2010 | Kelly et al. | |
| 2010/0076906 A1* | 3/2010 | Eubank et al. | 705/36 R |

(Continued)

OTHER PUBLICATIONS

International Search Report and Written Opinion in corresponding International Patent Application No. PCT/US2011/038677, mailed Aug. 26, 2011.

(Continued)

*Primary Examiner* — Seye Iwarere
(74) *Attorney, Agent, or Firm* — Lempia Summerfield Katz LLC

(57) ABSTRACT

A calendar spread futures contract is a forward contract on the intermonth spread of futures contracts. The calendar spread futures contract can be independently traded and accounted for independent of the traditional roll periods of the complementary futures contracts. An open interest holder can hedge against price volatility in the related futures contracts that may occur prior to or during the roll period. In other words, the calendar spread futures contract locks in the current spread between the front-month contract and the first-deferred contract. Buying a calendar spread futures control is equivalent to buying the spread difference between the expiring contract and the second expiry. Selling a calendar spread futures contract is equivalent to selling the spread difference between the expiring contract and the second expiry.

18 Claims, 7 Drawing Sheets

(56) References Cited

U.S. PATENT DOCUMENTS

2010/0114753 A1* 5/2010 Osmanski et al. ............ 705/37
2011/0166985 A1* 7/2011 Sweeting ..................... 705/37
2012/0095938 A1* 4/2012 Hadi et al. ................. 705/36 R
2012/0123927 A1* 5/2012 Dawson ....................... 705/37
2012/0209757 A1* 8/2012 Sweeting ..................... 705/37
2012/0259795 A1* 10/2012 Hammond et al. ......... 705/36 R
2012/0296844 A1* 11/2012 Rosenthal et al. ......... 705/36 R

OTHER PUBLICATIONS

International Preliminary Report on Patentability in corresponding International Patent Application No. PCT/US2011/038677, mailed Dec. 4, 2012.

Patent Examination Report No. 1, from related Australian Application No. 2011261577, Sep. 20, 2013, AU.

* cited by examiner

CALENDAR SPREAD FUTURES

BACKGROUND

Futures contracts or futures are financial derivatives traded on an "exchange." One example of an exchange is the Chicago Mercantile Exchange Inc. (CME) or CME Group (CMEG) which provides a marketplace where futures and options on futures are traded. The exchange establishes, for each market provided thereby, a specification that defines at least the products traded in that market, minimum quantities that must be traded, and minimum changes in price, which are often referred to as the tick size. The exchange operates as either an open outcry environment or an electronic trading platform. An open outcry environment is one in which traders exchange information by either shouting or the use of hand signals. An electronic trading platform involves software used to send an order to the exchange.

Traders access an electronic trading platform using trading software that displays at least a portion of the order book for a market. The order book contains previously received orders. In this way, incoming orders are matched with previously received orders. Through the trading software, a trader provides parameters for an order for the product traded in the market.

The term "futures" is used to designate all contracts covering the purchase and sale of financial instruments or physical commodities for future delivery on a commodity futures exchange. The financial instrument or physical commodity is referred to as the underlying asset or underlying instrument. A futures contract is a legally binding agreement to buy or sell an underlying asset at a specified price at a predetermined future time. The specified price is the futures price. The predetermined future time is the expiration date. Each futures contract is standardized in terms of underlying asset, quantity, and expiration date. An open interest holder of a futures contract that calls for physical delivery may be discouraged from using futures contracts because of volatility. An example of an open interest holder of futures contracts with aversion to volatility would be a hedge fund manager who is required to keep a specific position in a specific physical commodity or financial instrument. This type of open interest holder would prefer to completely hedge against price fluctuations in either direction.

Typically, this type of trader will maintain their market position from one contract period to the next by obtaining futures contracts with a more distant expiry as the futures contracts, which make up their current position, expire. This process is referred to as "rolling." By rolling from one contract period to the next, the trader is able to maintain a constant position in the underlying commodity of the futures contract. Conventionally, futures contracts with expiries in the nearby delivery month are called the "front-month contract." Futures contracts with expiries in the subsequent month or time period are called "deferred contracts." For example, futures contracts that expire at the next available time period would be first-deferred contracts and futures contracts that expire two time periods in the future from the nearby delivery month would be second-deferred contracts, and so on.

Futures contracts that call for physical delivery are especially vulnerable to costs such as financing, insurance, storage, transportation, or others. Fluctuations in these costs can dramatically impact the cost of delivery and can cause the price of futures contracts to vary dramatically. This volatility gives rise to costs to open interest holders who intend to roll their market position to the next contract time period just prior to the expiration of the front-month contract. These costs discourage open interest holders, who wish to maintain their current position, from continuing to use futures contracts that call for physical delivery.

Four strategies are available to open interest holders who wish to maintain their current positions in futures contracts that call for physical delivery. First, open interest holders may attempt to roll their current positions prior to the commencement of traditional roll periods. The roll period is the time period when the market for the first-deferred contract begins to develop. One example of the first strategy may be seen in Treasury futures.

FIGS. 1 and 2 illustrate historical data for the roll period for exemplary Treasury futures. The roll period is shown in the graphs where the percentage of open interest in the deferred month contract increases dramatically. The roll period may be defined as the time period from the time that open interest in the second expiry passes through the 10% and 90% thresholds. However, it should be noted that the 10% and 90% thresholds are exemplary and only one possible illustration of the roll period. For the 2-Year U.S. Treasury Note futures contract, as shown in FIG. 1, the last trading day occurs on the last business day of the contract month and the first delivery date occurs 19-23 business days before the last trading day, as shown by box 10 in FIG. 1. Accordingly, the roll period occurs during an 11 to 13 day window that straddles the first delivery day of the expiring contract, as shown by box 20 in FIG. 1.

For the 10-Year U.S. Treasury Note futures contract, as shown in FIG. 2, the last trading day occurs on the seventh business day before the last business day of the contract month. The first delivery date occurs 12 to 16 days before the last trading day, as shown by box 30 in FIG. 2. Accordingly, the roll period occurs during an 11 to 13 day window that straddles the first delivery day of the expiring contract, as shown by box 40 in FIG. 2.

Open interest holders may attempt to roll prior to the commencement of the roll period to avoid adverse price movements in the futures calendar spread. For example, the holder of a March contract (front-month contract) could attempt to roll his position into a June contract (first-deferred contract) before the roll period begins. However, this strategy is significantly limited by the availability of a party who is willing to sell June contracts before the roll period. Trading in the second expiry is generally modest at best. Normally, open interest holders who attempt this strategy find market liquidity insufficient to roll from the current front-month contract into the first-deferred contract prior to the established roll periods.

A second strategy, available to open interest holders who wish to maintain their current positions in futures contracts that call for physical delivery, would be to attempt to roll their current positions from the front-month contract into the second-deferred contract thereby skipping or bypassing the first-deferred contract altogether. Normally, open interest holders who attempt this strategy find market liquidity insufficient to roll from the current front-month contract into the second-deferred contract prior to or during established roll periods. Rolls into the second-deferred contract may be very difficult or impossible to execute because very little futures activity occurs in the second-deferred contract during the traditional roll periods from the front-month contract to the first-deferred contract.

A third strategy, available to open interest holders who wish to maintain their current positions in futures contracts that call for physical delivery, would be to close out their positions in the front-month contract prior to the last trading day and then to re-establish their positions in the first-deferred or second-deferred contracts later in the hope that overall market conditions that cause volatility will have subsided. Open interest holders who attempt this strategy are significantly exposed to market risks because they have closed out their positions completely for a short period of time.

A fourth strategy, available to open interest holders who wish to maintain their current positions in futures contracts that call for physical delivery, would be to simply exit the futures market and move their business to the over-the-counter (OTC) market. Moving to the OTC market is not attractive because of the high administrative costs, limited market access, poor market transparency, and counter-party risk exposure of transacting in the OTC market.

It would be desirable to facilitate open interest holders who wish to maintain their current positions in futures contracts that call for physical delivery.

DETAILED DESCRIPTION

Figure 1:
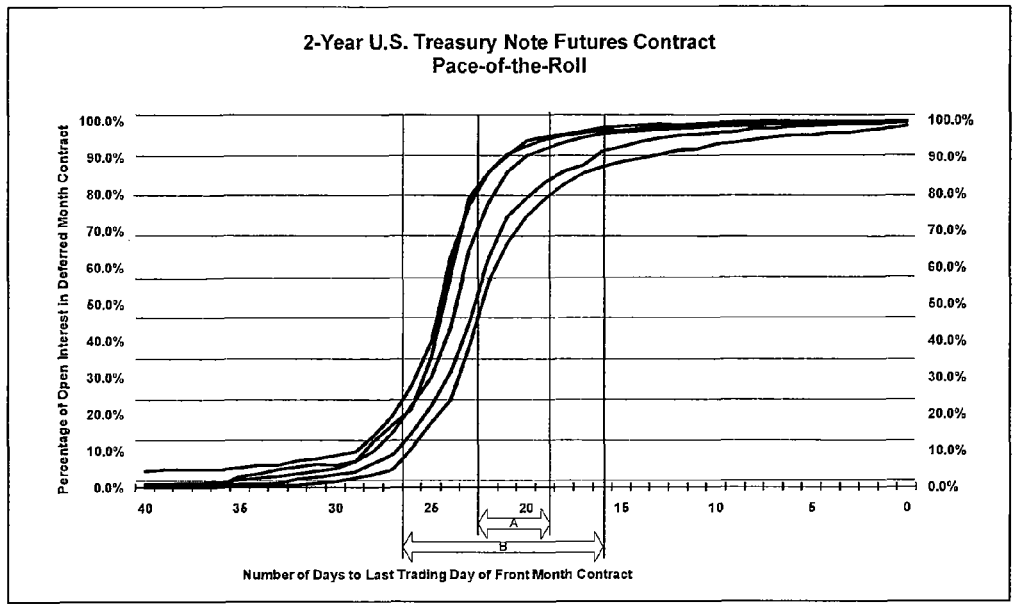
FIG. 1 illustrates historical data for the roll period of the 2-Year U.S. Treasury Note futures contract.

The present embodiments relate to calendar spread futures contracts. In one embodiment, a system is disclosed for implementing a calendar spread futures contract as an independent financial derivative. Calendar spread futures contracts are forward contracts on the intermonth spread of futures contracts. Calendar spread futures contracts can be independently traded and accounted for independent of the traditional roll periods of the complementary futures contracts. Calendar spread futures contracts may be cash settled.

A trader wishing to maintain a constant position using futures contracts is particularly adverse to volatility, and may wish to avoid fluctuations in price, both favorable and unfavorable. The volatility that occurs in futures contracts calling for physical delivery may discourage the trader from using futures contracts. One way to avoid this volatility is to lock in the current spread between front-month contract and the first-deferred contract using a calendar spread futures contract.

Buying a calendar spread futures control is equivalent to buying the spread difference between the expiring contract and the second expiry. Selling a calendar spread futures contract is equivalent to selling the spread difference between the expiring contract and the second expiry. One application of a calendar spread futures contract is to permit the holder of a calendar spread to substantially hedge against movements in the market in either direction.

Calendar spread futures contracts also allow market participants to accumulate larger position levels that are unfettered by regulatory concerns regarding limitations in the sizes of the physical stocks that underlie the futures contracts themselves.

By buying and selling calendar spread futures contracts, open interest holders will be able to lock in the spread difference prior to rolling from the expiring contract into the second expiry. By locking in the spread, open interest holders can hedge their roll costs against changes in the cheapest-to-deliver instrument and in the related carrying costs of that instrument. Carrying costs may include financing, insurance, storage, transportation, and other costs that may cause the spread to narrow, widen, or become increasingly volatile.

Calendar spread futures may be constructed to complement any futures contracts in which the underlying asset requires physical delivery. Assets that require physical delivery may be any commodity such as corn, soybeans, gold, copper, pork bellies, and many others.

The underlying asset of the calendar spread futures contract may be Treasuries, such as Treasury notes or Treasury bonds. Specific examples include the 2-Year Treasury Note futures, the 5-Year Treasury Note futures, the 10-Year Treasury Note futures, and the 30-Year Treasury Bond futures. Calendar spread futures contracts, including Treasuries futures, may permit a trader to gain or shed exposure to price movements in the calendar spreads of Treasuries futures.

Calendar spread futures contracts may be traded on the Exchange by way of a clearing house using a trading engine. Every day, all trades are confirmed, matched and settled through the clearing house. As the counterparty to each trade, the clearing house becomes a buyer to each seller and a seller to each buyer. However, in order for a trade to occur, there must be both a buyer and a seller. The clearing house protects both the buyer and seller from financial loss by assuring performance. This is facilitated by requiring performance bonds (margins) of both buyers and sellers on the Exchange.

In one embodiment, a settlement price is determined for each contract and all open positions are marked to that price. This procedure is referred to as "mark-to-market." The mark-to-market procedure typically occurs midway or at the end of each trading period, e.g., each trading day. Every contract is debited or credited based on that trading session's gains or losses. As prices move for or against a position, funds flow into and out of the trading account.

In one exemplary procedure, each business day by 6:40 a.m. Chicago time, based on the mark-to-market of all open positions to the previous trading day's settlement price, the clearing house pays to or collects cash from each clearing member. This cash flow, known as settlement variation, is performed by settlement banks based on instructions issued by the clearing house. All payments to and collections from clearing members are made in "same-day" funds. In addition to the 6:40 a.m. settlement, a daily intra-day mark-to-market of all open positions, including trades executed during the overnight trading session on the electronic trading system, and the current day's trades matched before 11:15 a.m., is performed using current prices. The resulting cash payments are made intra-day for same day value. In times of extreme price volatility, the clearing house has the authority to perform additional intra-day mark-to-market calculations on open positions and to call for immediate payment of settlement variation.

Figure 3:
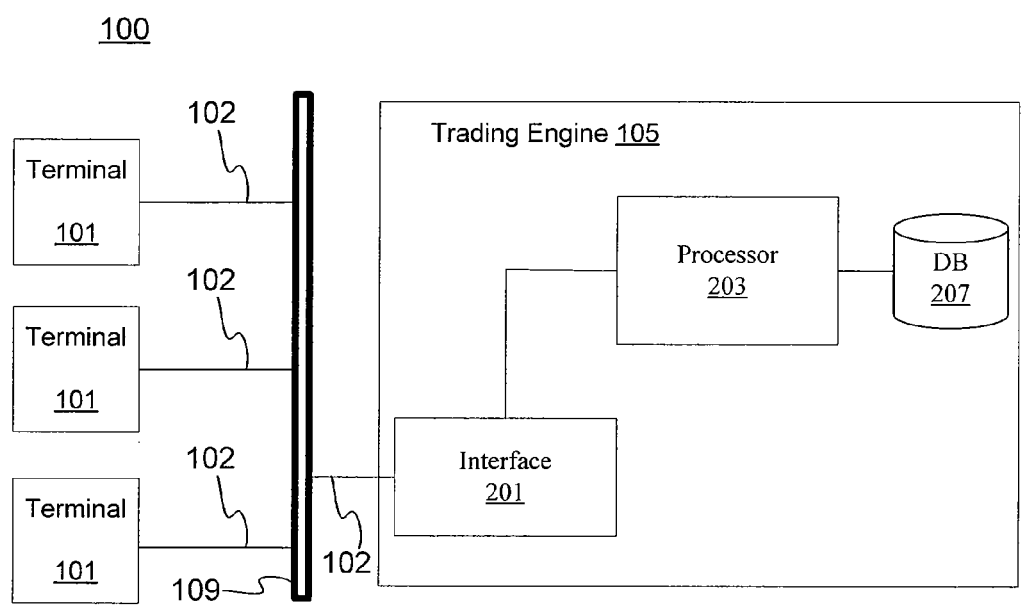
FIG. 3 illustrates a system for offering calendar spread futures contracts using an electronic trading system.

FIG. 3 illustrates a system for offering calendar spread futures contracts using an electronic trading system. The electronic trading system 100 includes one or more terminals 101 coupled with network 109 and a trading engine 105, where all the components are coupled with each other in any suitable combination by a communication link 102 so as to facilitate communications between the components. As used herein, the phrase "coupled with" is defined to mean directly connected to or indirectly connected through one or more intermediate components. Such intermediate components may include both hardware and software based components.

The trading engine 105 includes a matching processor 203, an interface 201, and a database 207. Matching processor 203 comprises one or more microprocessors, micro-controllers, or digital signal processors, having an electronic erasable program read only memory (EEPROM) or flash memory, static random access memory (RAM), a clocking/timing circuit, or any typical processor utilized in an electrical device. In another embodiment, the selection processor 203 may be implemented as a combination software algorithm and hardware device.

Database 207 may be a hard disk drive, a memory, or any suitable type of computer readable medium. The database 207 may also store the order book containing previously received orders. In this way, incoming orders are matched with previously received orders.

Interface 201 includes a modem, network interface card, or other hardware components necessary for the trading engine 105 to communicate with the terminals 101 by way of communication link 102. In one embodiment, the interface 102 includes a data conversion device, such as a modem, that converts data from one form into another, e.g., converts data from one form usable with electronic equipment to another form useable over wireless or landline communication technologies.

Preferably, the communication link 102 connects the terminals 101 with the trading engine 105 over a small geographical area. Alternatively, the communication link 102 may connect the terminal 101 and trading engine 105 over a vast geographical area. In one embodiment, the communication link 102 includes a network such as a local area network ("LAN"), a wide area network ("WAN"), a metropolitan area network, a virtual area network, a wireless local network, a local bus, a direct or indirect satellite network, or combinations thereof. Further, any of the communications links 102 or network 109 may include a publicly accessible network such as the Internet, a privately accessible network such as an Intranet, or a combination of privately and publicly accessible networks. Preferably, the communication link 102 provides a high-bandwidth data communication link that achieves high transmission speeds and low latency. Further, the communications link 102 may utilize secure protocols, such as secure-Hypertext Transfer Protocol ("SHTTP"), pretty good privacy ("PGP"), etc., to ensure that communications among the devices coupled with the link 102 are authorized, authentic and/or otherwise uncompromised.

Preferably, terminal 101 includes a memory, an interface, a processor, and operating firmware/software that perform functions, such as receiving input from a user, generating and transmitting requests to the trading engine 105 and receiving responses to those requests. Terminal 101 may be a conventional computer, a hybrid personal computer, a personal digital assistant (PDA), a laptop computer, a mobile telephone or any other device that can receive and send information through a communication link. Terminal 101 may also include a display device, a keyboard, a mouse, a touch panel, a graphical user interface (GUI), a printer, a scanner, and/or other input/output devices associated with a computer for interacting with a user of the terminal 101. In one embodiment, terminal 101 is a personal computer having a processor, a suitable memory, hard disk and user interface and a network interface compatible with the communications link 102.

As shown in FIG. 3, terminal 101 is connected through the communication link 102 to the trading engine 105. A user (trading entity) may enter a request via terminal 101 to buy a spread difference between a first futures contract having a first delivery date and a second futures contract having a second delivery date, and another user may enter a request via another terminal 101 to sell the spread difference between the first futures contract having the first delivery date and the second futures contract having the second delivery date.

Trading engine 105 is also a matching system, i.e., a system capable of receiving bids and offers and otherwise managing the execution of trades in a marketplace, such as the GLOBEX® trading system provided by the Chicago Mercantile Exchange Inc. or CME Group, which is located in Chicago, Ill. The trading engine 105 matches orders electronically according to one or more trade matching algorithms, such as a first-in-first-served algorithm, an allocation algorithm, or a market maker priority algorithm. An "order" can be a bid to purchase or an offer to sell. In one embodiment, the trading engine 105 is implemented as a software program which executes on a computer system capable of executing the trading engine 105 and interfacing with the communications link 102. Alternatively, the trading engine 105 may be implemented as a combination of hardware and software.

In one implementation, when processor 203 of trading engine 105 receives a request from terminal 101 to buy or sell the spread difference, the trading engine 105 subsequently provides notification to the other terminals 101 or all terminals 101 that the complementary calendar spread futures contract is available for trading. When processor 203 of trading engine 105 receives a second request from another terminal 101 for the complementary calendar spread futures contract, the trading engine 105 executes a trade for the calendar spread futures contract, by matching the first request and the second request such that the first entity holds a long position in the calendar spread futures contract and the second entity holds a short position in the calendar spread futures contract.

In one embodiment, database 207 stores representative data of all available futures contracts and expiration dates. Processor 203 performs a basic Boolean, numeric, or alphanumeric search on the data stored in the database using search parameters. The database 207 may be kept up to date by the trading engine 105 as to the currently available contracts.

Trading engine 105 matches requests received from terminals 101 to define a calendar spread futures contract available for trading as an independent financial instrument. The trading engine 105 communicates the availability of the calendar spread futures contract back to terminals 101.

Figure 2:
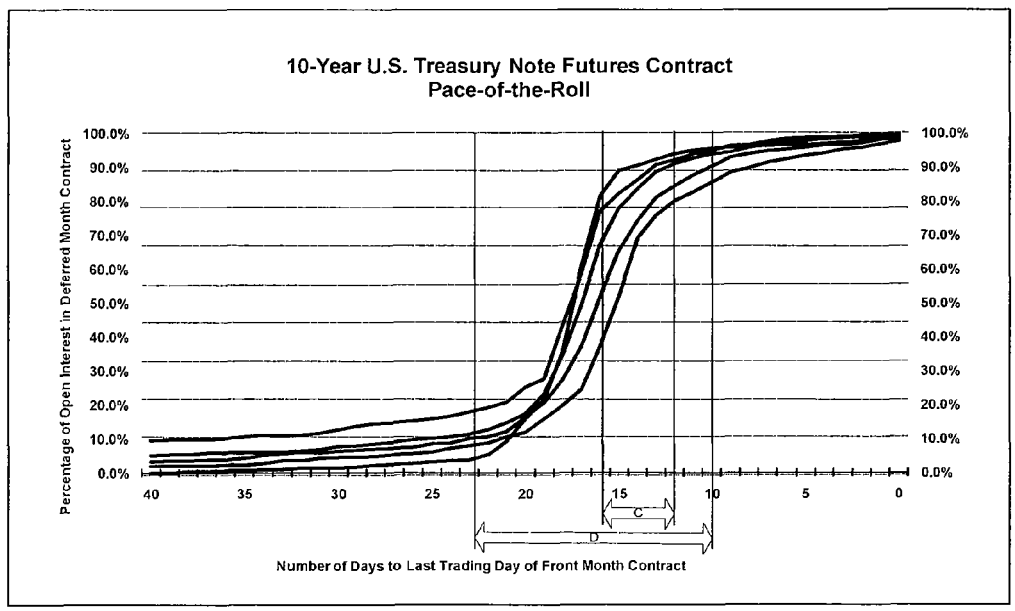
FIG. 2 illustrates historical data for the roll period of the 10-Year U.S. Treasury Note futures contract.
Figure 4:
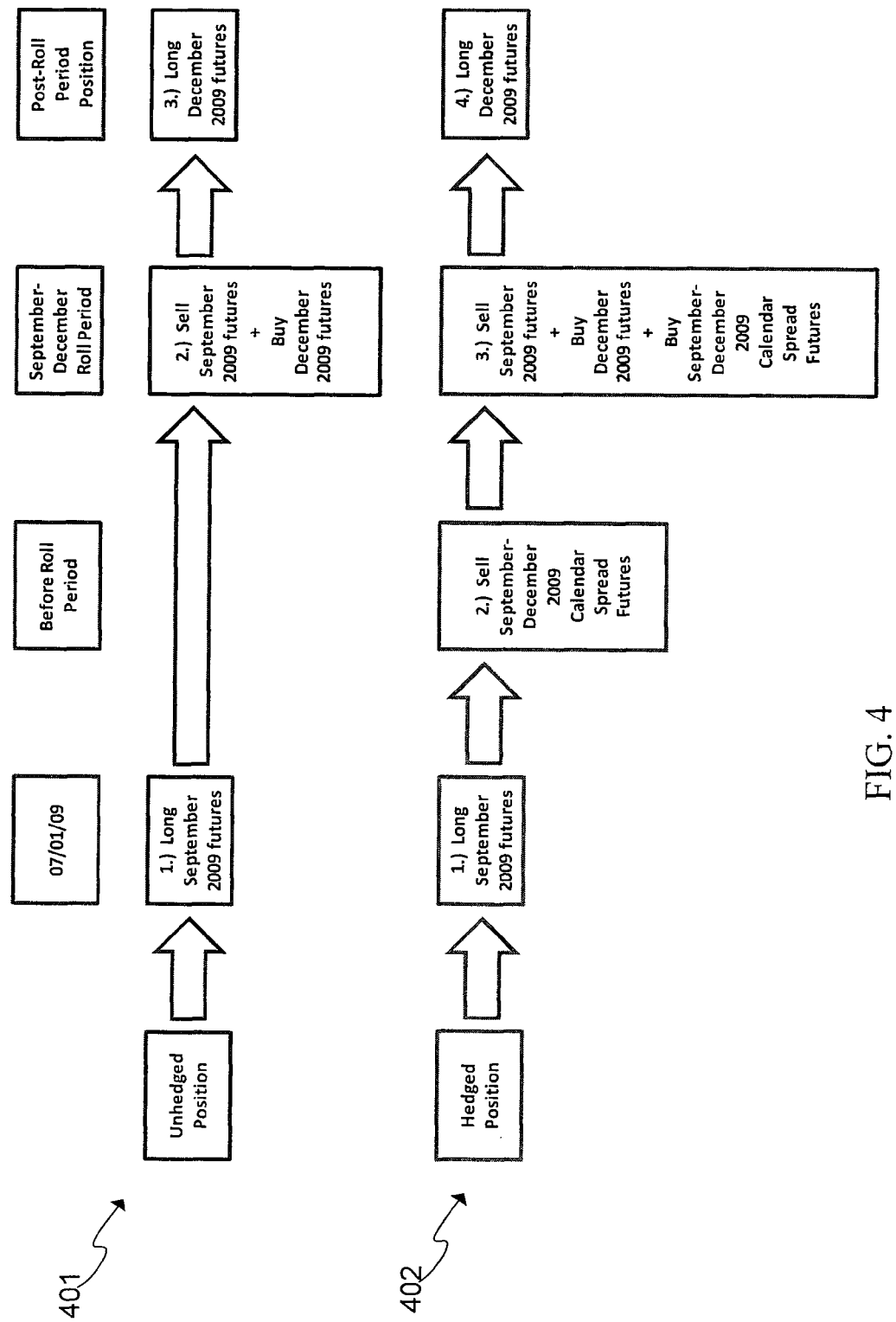
FIG. 4 illustrates one exemplary calendar spread futures contract to complement a long futures position.

FIG. 4 illustrates one exemplary use of the calendar spread futures contract that complements a long futures position. Sequence 401 is the unhedged position that is available to traders without the use of a calendar spread futures contract. The open interest holder has a long position in the September 2009 futures. During the September to December roll period, which is discussed above with respect to FIGS. 1 and 2, the open interest holder may move to the next expiry period by selling September 2009 futures and buying December 2009 futures.

The trader that chooses sequence 401, including the long position in the September 2009 futures, is naturally short the calendar spread. If the calendar spread tightens before the roll is executed, the trader benefits. If the calendar spread widens before the roll is executed, the trader is exposed. The trader's post roll period position will be long December futures. However, during the roll period, the open interest holder was susceptible to volatility and price fluctuation during and before the roll period.

Sequence 402 is the hedged position available to traders through the use of the calendar spread futures contract. The open interest holder has a long position in the September 2009 futures. At some time before the September to December roll period, the open interest holder will sell September-December Calendar Spread futures contracts. During the September to December roll period, the open interest holder may move to the next expiry period by selling September 2009 futures and buying December 2009 futures as well as buying back the September-December Calendar Spread futures contract. The open interest holder's post roll period position will be long December futures.

The open interest holder in sequence 402 will be hedged against fluctuations between the September 2009 futures and the December 2009 futures. Regardless of whether the spread widens or narrows before the roll is executed, the trader's position will be hedged because the opposite movement will occur in the September-December Calendar Spread futures contract.

Figure 5:
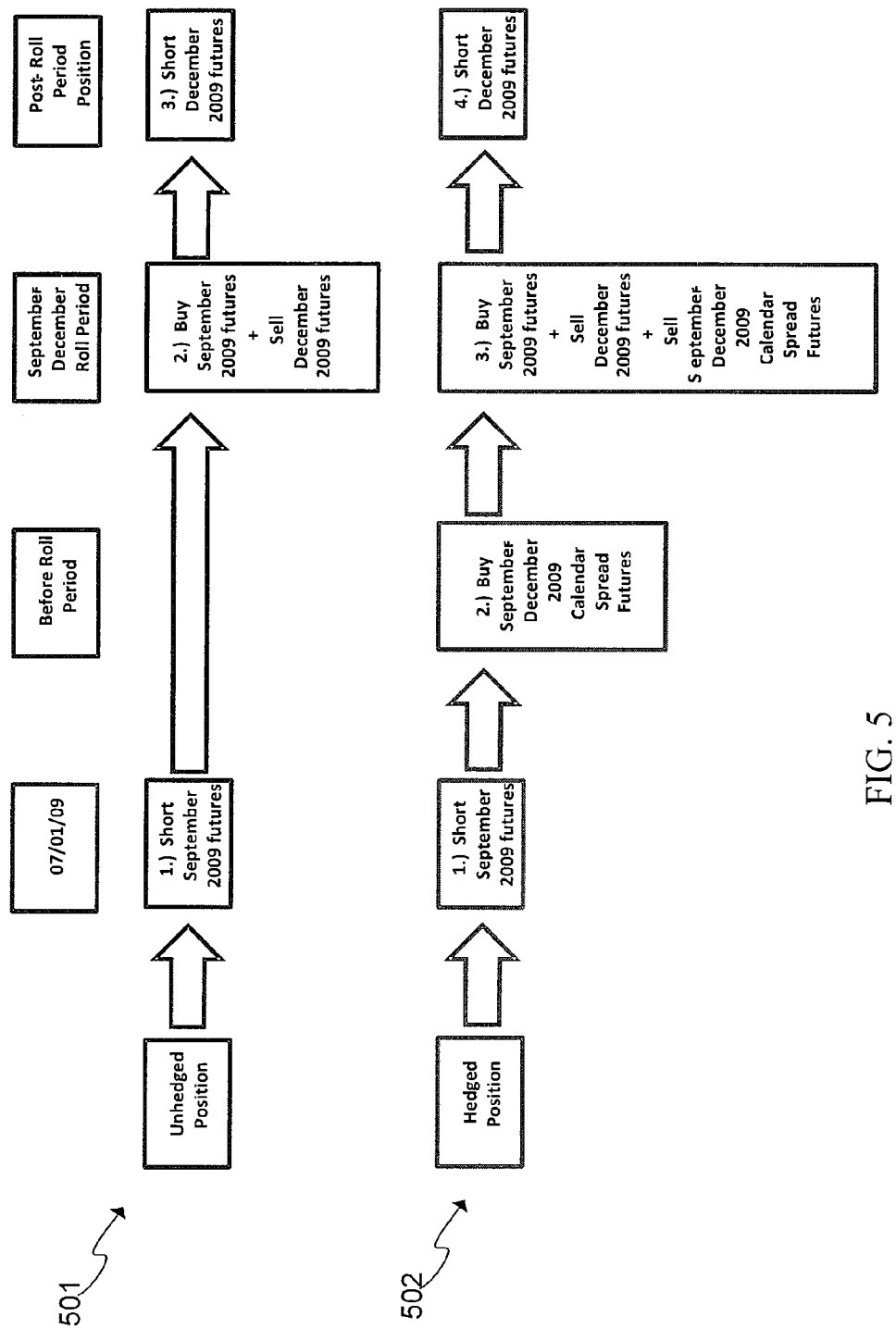
FIG. 5 illustrates one exemplary calendar spread futures contract to complement a short futures position.

FIG. 5 illustrates one exemplary use of the calendar spread futures contract that complements a short futures position. Sequence 501 is the unhedged position without the use of a calendar spread futures contract. If the calendar spread widens before the roll is executed, the trader benefits. If the calendar spread tightens before the roll is executed, the trader is exposed. The trader's post roll period position will be long December futures, however during the roll period, the open interest holder was susceptible to volatility and price fluctuation during and before the roll period.

Sequence 502 is the hedged position available to traders through the use of the calendar spread futures contract. Regardless of whether the spread widens or narrows before the roll is executed, the trader's position will be hedged because the opposite movement will occur in the September-December Calendar Spread futures contract.

Figure 6:
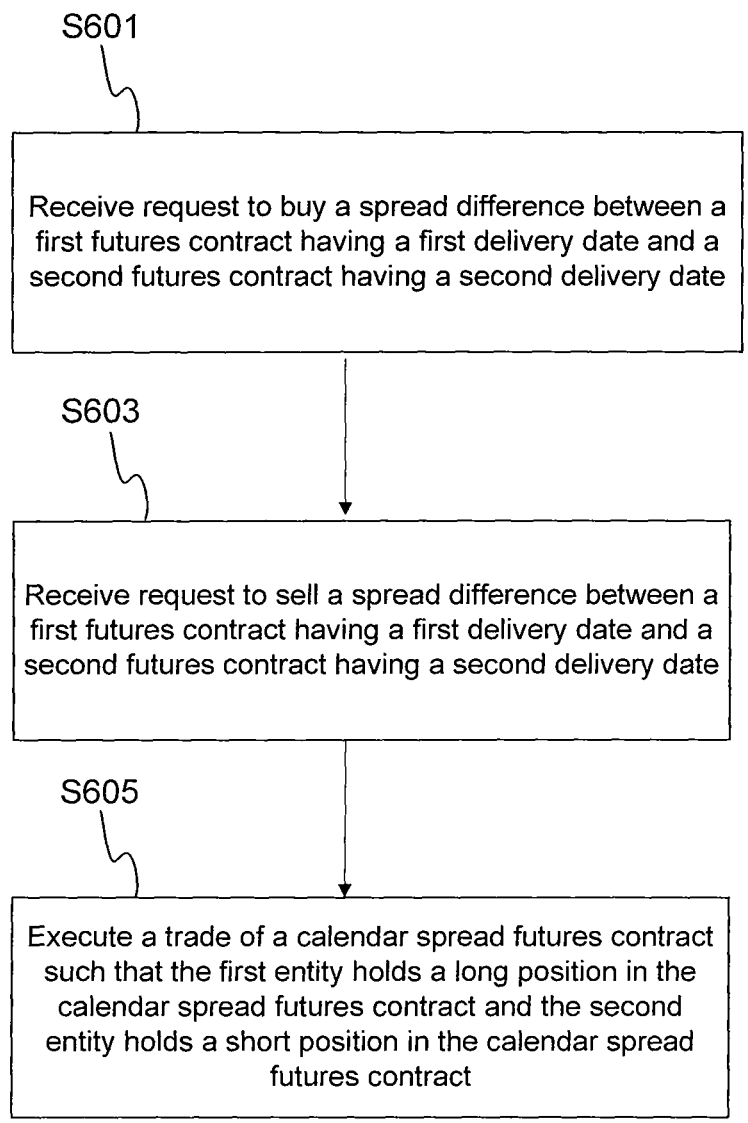
FIG. 6 illustrates an exemplary flow chart for trading a calendar spread futures contract.
Figure 7:
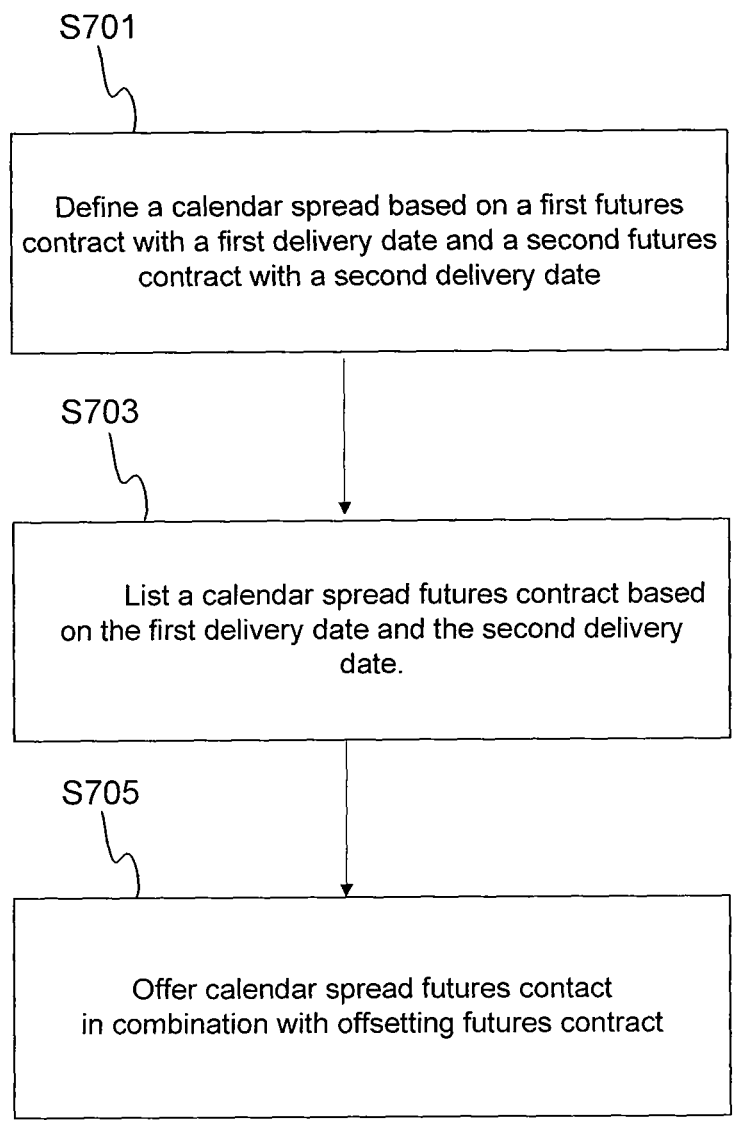
FIG. 7 illustrates another exemplary flow chart for defining a calendar spread futures contract.

FIG. 6 illustrates an exemplary process of trading a calendar spread futures contract as standalone futures contracts on the intermonth forward spread between the expiring futures contract and the deferred-month futures contract. At block S601, a request to buy a spread difference between a first futures contract having a first delivery date and a second futures contract having a second delivery date is received. At block S603, a request to sell a spread difference between a first futures contract having a first delivery date and a second futures contract having a second delivery date is received. The requests of blocks S601 and S603 may occur in any order and at or near the same time. At block S605, a calendar spread futures contract is traded such that the first entity holds a long position in the calendar spread futures contract and the second entity holds a short position in the calendar spread futures contract. The price of the calendar spread futures contract is free to fluctuate according to the market for the calendar spread futures contract, independent of the underlying assets. FIG. 7 illustrates another aspect of trading calendar spread futures contracts. At block S701, the Exchange defines a calendar spread based on futures contracts with a first expiration month (first delivery date) and futures contracts in a second expiration month (second delivery date). The first expiration month may be the expiring contract and the second expiration month may be the first-deferred contract. Alternatively, the first expiration month may be the first-deferred contract and the second expiration month may be the second-deferred contract or the first expiration month may be the second-deferred contract and the second expiration month may be the third-deferred contract, and so on. At block S703, the Exchange lists a calendar spread futures contract based on the first delivery date and the second delivery date. At step S705, the Exchange by use of the trading engine 105 offers the calendar spread futures contract in combination with the offsetting position in the underlying futures contract.

Figure 8:
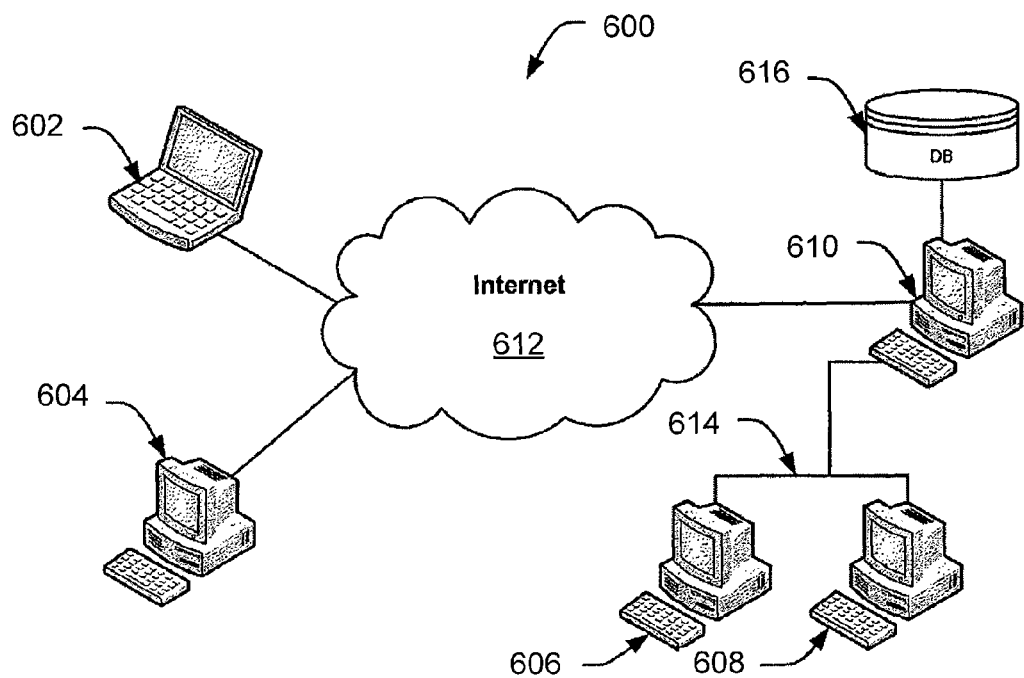
FIG. 8 illustrates one embodiment of the systems and devices for carrying out the processes of FIGS. 6 and 7.

FIG. 8 illustrates one embodiment of a system 600 configured to implement one or more of the disclosed trading methods, allocation algorithms, etc. The system 600 may include multiple terminals 602 to 608 directly and/or indirectly in communication with an order management terminal 610. For example, the terminals 602 and 604 may communicate with the order management terminal 610 via the Internet 612, a wide area network (WAN), and/or other communication networks. The terminals 606 and 608 may communicate with the order management terminal 610 via, for example, a communication network 614 such as an Ethernet network, a wireless fidelity (WiFi), and/or other communication networks. The order management terminal 610 may, in turn, be in communication with a database 616 or other memory or storage device or medium. The database 616 may be configured to store, in an accessible manner, the information, algorithms, parameters, etc. necessary to implement and monitor the trading methods and allocation algorithms disclosed herein. The database 616 may be a separate device or logical construct or may be a portion of the order management terminal 610.

Figure 9:
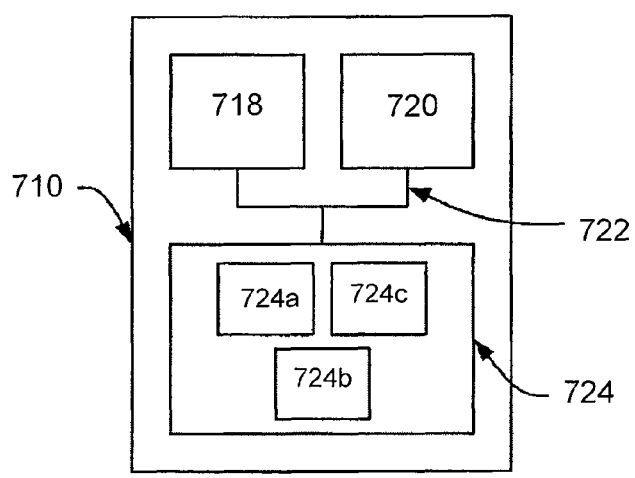
FIG. 9 illustrates one embodiment of the devices in the system of FIG. 8 for carrying out the processes of FIGS. 6 and 7.

FIG. 9 illustrates one example of a logical configuration that may be implemented in the order management terminal 710. For example, the order management terminal 710 may include a communication module 718 and a memory 720 in communication with a processor 724 via a communication bus 722. The memory may include RAM, ROM, flash memory, or any other type of known storage medium. Moreover, the memory 720 may include the database 716 stored thereon. The communication module 718 may be a wireless communication module or may be a wired communication module.

The processor 724 may be a general purpose processor configured to execute the disclosed trading methods, allocation algorithms, and other methods disclosed herein. Alternatively, the processor 724 may represent one or more application specific processor or modules, 724a, 724b, and 724c. For example, the module 724a may be a FIFO allocation module or processor; the module 724b may be a pro-rata allocation module or processor; and the module 724c may be a tracking module or processor for processing and updating the order state associated with each method and/or algorithm.

The steps, elements, and processes discussed herein may be encoded as program logic, computer readable code, and/or instructions. These encoded elements, in turn, may be stored or embedded on a computer readable medium such as, for example, a hard disk drive, a solid state drive, or other storage medium. The computer readable medium may be in communication with a processor which, in response to an appropriate input or command, may execute the program logic stored on the computer readable medium. The execution of this program logic may result in the execution of the step, elements, and processes embodied and discussed herein.

The system for trading calendar spread futures contracts may alternatively be embodied using a processor and a memory coupled to the processor. Such an embodiment includes first logic stored in the memory and executable by the processor to receive a first request from a first entity to buy a spread difference between a first futures contract having a first delivery date and a second futures contract having a second delivery date, second logic stored in the memory and executable by the processor to receive a second request from a second entity to sell a spread difference between a first futures contract having a first delivery date and a second futures contract having a second delivery date; and third logic stored in the memory and executable by the processor to coupling the first request and the second request as a calendar spread futures contract such that the first entity holds a long position in the calendar spread futures contract and the second entity holds a short position in the calendar spread futures contract.

It should be understood that various changes and modifications to the presently preferred embodiments described herein will be apparent to those skilled in the art. Such changes and modifications can be made without departing from the teachings of the present invention and without diminishing its intended advantages. It is therefore intended that such changes and modifications be covered by the appended claims.

We claim:

1. A method of trading a calendar spread futures contract using an electronic trading system, the method comprising:
   receiving, by a processor, a first request from a first entity via a first terminal to buy a spread difference between a first futures contract having a first delivery date and a second futures contract having a second delivery date;
   receiving, by the processor, a second request from a second entity via a second terminal to sell the spread difference between the first futures contract having the first delivery date and the second futures contract having the second delivery date; and
   executing a trade of a calendar spread futures contract, using the trading engine, by matching the first request and the second request such that the first entity holds a long position in the calendar spread futures contract and the second entity holds a short position in the calendar spread futures contract.

2. The method of claim 1, further comprising:
   outputting at least one of the long position, the short position, or the calendar spread futures contract to a terminal.

3. The method of claim 1, wherein the first futures contract and the second futures contract call for physical delivery.

4. The method of claim 1, wherein an underlying asset of the first futures contract is a Treasury note, a Treasury bond, or a commodity.

5. The method of claim 1, wherein the first delivery date is a next available delivery month and the second delivery date is a first-deferred delivery month.

6. The method of claim 1, wherein the first delivery date is a first-deferred delivery month and the second delivery date is a second-deferred delivery month.

7. The method of claim 1, wherein the first delivery date is a second-deferred delivery month and the second delivery date is a third-deferred delivery month.

8. The method of claim 1, wherein a mark-to-market position in the calendar spread futures contract is recorded in trading accounts of the first entity and the second entity.

9. A system for trading calendar spread futures contracts on an exchange, the system comprising:
   a terminal operable to receive a first order from a first entity to buy a spread difference between a first futures contract having a first delivery date and a second futures contract having a second delivery date;
   a memory storing at least a second order to from a second entity to sell a spread difference between a first futures contract having a first delivery date and a second futures contract having a second delivery date; and
   a trading engine operable to match the first request and the second request as a calendar spread futures contract such that the first entity holds a long position in the calendar spread futures contract and the second entity holds a short position in the calendar spread futures contract.

10. The system of claim 9, wherein the terminal receives data based on at least one of the calendar spread futures contract, long position, or short position from the trading engine.

11. The system of claim 9, wherein the first futures contract and the second futures contract call for physical delivery.

12. The system of claim 9, wherein an underlying asset of the futures contract is a Treasury note, a Treasury bond, or a commodity.

13. The system of claim 9, wherein the first delivery date is the next available delivery month and the second delivery date is the first-deferred delivery month.

14. The system of claim 9, wherein the first delivery date is the first-deferred delivery month and the second delivery date is the second-deferred delivery month.

15. The system of claim 9, wherein the first delivery date is the second-deferred delivery month and the second delivery date is the third-deferred delivery month.

16. The system of claim 9, wherein a mark-to-market position in the calendar spread futures contract recorded in the trading accounts of the first entity and the second entity.

17. A system for trading calendar spread futures contracts, the system comprising:
   means for receiving a first request from a first entity to buy a spread difference between a first futures contract having a first delivery date and a second futures contract having a second delivery date;
   means for receiving a second request from a second entity to sell a spread difference between a first futures contract having a first delivery date and a second futures contract having a second delivery date; and
   means for matching the first request and the second request as a calendar spread futures contract such that the first entity holds a long position in the calendar spread futures contract and the second entity holds a short position in the calendar spread futures contract.

18. A system for trading calendar spread futures contracts by way of a trading engine comprising a processor and a memory coupled to the processor, the system further comprising:
   first logic stored in the memory and executable by the processor to receive a first request from a first entity to buy a spread difference between a first futures contract having a first delivery date and a second futures contract having a second delivery date;
   second logic stored in the memory and executable by the processor to receive a second request from a second entity to sell a spread difference between a first futures contract having a first delivery date and a second futures contract having a second delivery date; and
   third logic stored in the memory and executable by the processor to trade a calendar spread futures contract by matching the first request and the second request such that the first entity holds a long position in the calendar spread futures contract and the second entity holds a short position in the calendar spread futures contract.

* * * * *